US010464242B2

(12) United States Patent
Koike et al.

(10) Patent No.: US 10,464,242 B2
(45) Date of Patent: Nov. 5, 2019

(54) CONVEY DEVICE, MOLDED ARTICLE MANUFACTURING APPARATUS, AND METHOD OF MANUFACTURING MOLDED ARTICLE

(71) Applicant: TOSHIBA KIKAI KABUSHIKI KAISHA, Chiyoda-Ku, Tokyo (JP)

(72) Inventors: Jun Koike, Suntou-gun (JP); Akira Yoshinaga, Numazu (JP); Nobuyuki Asanuma, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/208,504

(22) Filed: Dec. 3, 2018

(65) Prior Publication Data

US 2019/0099929 A1    Apr. 4, 2019

Related U.S. Application Data

(60) Division of application No. 14/742,551, filed on Jun. 17, 2015, now Pat. No. 10,179,432, which is a
(Continued)

(30) Foreign Application Priority Data

Dec. 19, 2012   (JP) .................... 2012-277140
May 15, 2013   (JP) .................... 2013-103069
Jul. 31, 2013    (JP) .................... 2013-158762

(51) Int. Cl.
*B29C 45/14* (2006.01)
*B29C 31/08* (2006.01)
(Continued)

(52) U.S. Cl.
CPC ........ *B29C 45/14008* (2013.01); *B29C 70/46* (2013.01); *F27B 9/30* (2013.01);
(Continued)

(58) Field of Classification Search
CPC ........ B29C 45/14008; B29C 45/14877; B29C 31/008; B29C 31/08
See application file for complete search history.

(56) References Cited

U.S. PATENT DOCUMENTS 4,075,266 A    2/1978   Theysohn
4,344,749 A    8/1982   Fritz et al.
(Continued)

FOREIGN PATENT DOCUMENTS

CN    1118582     3/1996
CN    1525909     9/2004
(Continued)

OTHER PUBLICATIONS

Chinese Office Action issued in CN 201380066460.8 dated Mar. 28, 2019.
(Continued)

*Primary Examiner* — Robert B Davis
(74) *Attorney, Agent, or Firm* — DLA Piper LLP US

(57) ABSTRACT

A convey device, which conveys an insert member into a die, includes a holding device configured to hold the insert member in an attitude in which a major surface of the insert member is in a substantially gravitational direction; a convey mechanism configured to convey the insert member to the die, while the insert member is being held in the attitude by the holding device; and a heating device configured to heat the insert member. The insert member can be heated by the heating device before the insert member is disposed in the die.

3 Claims, 9 Drawing Sheets

Related U.S. Application Data continuation of application No. PCT/JP2013/084134, filed on Dec. 19, 2013.

(51) Int. Cl.
*B29C 70/46* (2006.01)
*F27B 9/30* (2006.01)
*B29K 101/12* (2006.01)
*B29K 105/08* (2006.01)

(52) U.S. Cl.
CPC *B29C 2045/14877* (2013.01); *B29K 2101/12* (2013.01); *B29K 2105/089* (2013.01)

(56) References Cited

U.S. PATENT DOCUMENTS

| | | | |
|---|---|---|---|
| 4,368,018 | A | 1/1983 | Rees et al. |
| 4,639,341 | A | 1/1987 | Hanamoto et al. |
| 5,603,889 | A | 2/1997 | Ohno |
| 5,820,813 | A | 10/1998 | Hara et al. |
| 7,736,567 | B2 | 6/2010 | Yu |
| 2007/0184273 | A1 | 8/2007 | MacDonald et al. |

FOREIGN PATENT DOCUMENTS

| | | |
|---|---|---|
| CN | 101214719 | 7/2008 |
| CN | 101898401 | 12/2010 |
| DE | 19740468 | 1/1999 |
| FR | 2556645 | 6/1985 |
| JP | 03005117 | 1/1991 |
| JP | H07-227877 | 8/1995 |
| JP | H10-291217 | 11/1998 |
| JP | H11-70543 | 3/1999 |
| JP | 2000-015428 | 1/2000 |
| JP | 2001-170960 | 6/2001 |
| JP | 2011-005752 | 1/2011 |
| JP | 2012-106490 | 6/2012 |
| JP | 2012-179773 | 9/2012 |
| JP | 2012-200984 | 10/2012 |

OTHER PUBLICATIONS

India Office Action issued in IN 5269/DELNP/2015 dated Feb. 1, 2019.
International Search Report (with English translation) dated Apr. 1, 2014 issued in International Application No. PCT/JP2013/084134.
Written Opinion (with English translation) dated Apr. 1, 2014 issued in International Application No. PCT/JP2013/084134.
International Preliminary Report on Patentability dated Jun. 23, 2015 issued in International Application No. PCT/JP2013/084134.
Japanese Office Action (with English Translation) dated Oct. 22, 2013 issued in JP 2013-158762.
Japanese Office Action (with English Translation) dated Feb. 9, 2016 issued in JP 2014-553212.
Chinese Office Action (with English Translation) dated May 11, 2016 issued in CN 201380066460.8.
Japanese Office Action (with English Translation) dated Jul. 5, 2016 issued in JP 2014-553212.
English Language Abstract and English Language Translation of JPH 07-227877 published Aug. 29, 1995.
English Language Abstract and English Language Translation of JPH 10-291217 published Nov. 4, 1998.
English Language Abstract and English Language Translation of JPH 11-70543 published Mar. 16, 1999.
English Language Abstract and English Language Translation of JP 2012-200984 published Oct. 22, 2012.
English Language Abstract and English Language Translation of JP 2001-170960 published Jun. 26, 2001.
English Language Abstract of JP 2000-015428 published Jan. 18, 2000.
English Language Abstract and English Language Translation of JP 2011-005752 published Jan. 13, 2011.
English Language Abstract and English Language Translation of CN 1525909 published Sep. 1, 2004.
English Language Abstract and English Language Translation of CN 101898401 published Dec. 1, 2010.
Chinese Office Action (with English Translation) issued in CN 201380066460.8 dated Jan. 13, 2017.
Chinese Office Action (with English Translation) issued in CN 201380066460.8 dated Jul. 4, 2017.
Chinese Office Action issued in CN 201380066460.8 dated Jan. 5, 2018.
German Office Action issued in DE 11 2013 006 095.7 dated Mar. 14, 2018.

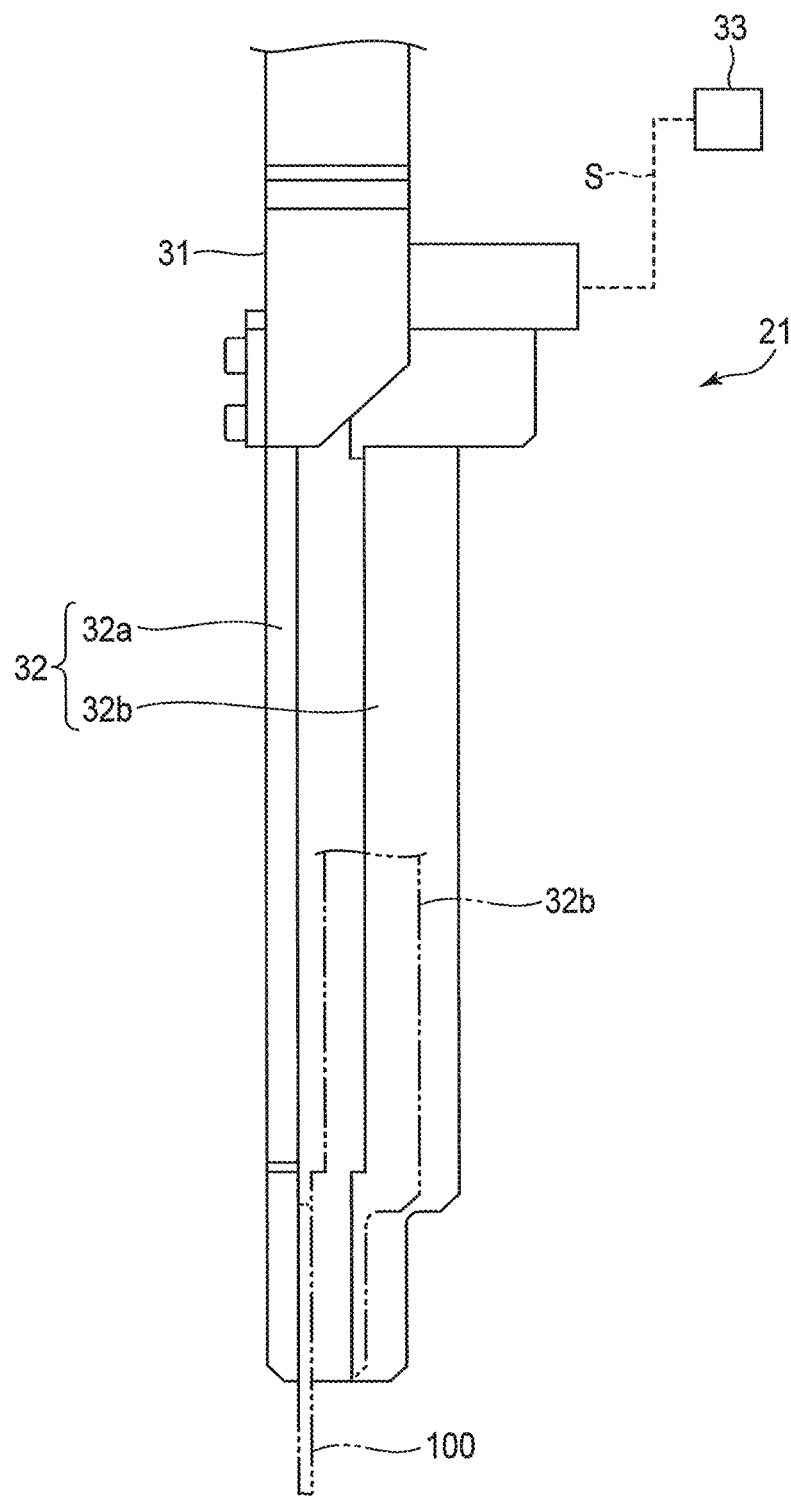
F I G. 3

CONVEY DEVICE, MOLDED ARTICLE MANUFACTURING APPARATUS, AND METHOD OF MANUFACTURING MOLDED ARTICLE

CROSS-REFERENCE TO RELATED APPLICATIONS

This application is a divisional of U.S. application Ser. No. 14/742,551 filed Jun. 17, 2015 which is a Continuation Application of PCT application No. PCT/JP2013/084134, filed Dec. 19, 2013, which was published under PCT Article 21(2) in Japanese.

This application is based upon and claims the benefit of priority from Japanese Patent Application No. 2012-277140, filed Dec. 19, 2012, Japanese Patent Application No. 2013-103069, filed May 15, 2013, and Japanese Patent Application No. 2013-158762, filed Jul. 31, 2013 the entire contents of all of which are incorporated herein by reference.

BACKGROUND OF THE INVENTION

1. Field of the Invention

The present invention relates to a convey device which conveys an insert member such as a thermoplastic prepreg, a molded article manufacturing apparatus which manufactures a molded article by using an insert member, and a method of manufacturing a molded article.

2. Description of the Related Art

Conventionally, as a method of manufacturing a molded article, there is known a technique in which an insert member is disposed in a die and is injection-molded by an injection molding apparatus, thereby manufacturing a molded article. Such an insert member is, before disposed in the die, heated by a heating device, in order to prevent an injected resin material from being quickly cooled.

In addition, conventionally, there is known a technique in which a thermoplastic prepreg is disposed in a die and pressed, thereby shaping the thermoplastic prepreg and manufacturing a molded article. Furthermore, there is also known a molded article manufacturing technique in which a thermoplastic prepreg is shaped, and, with the thermoplastic prepreg being used as an insert member, a molded part, such as a boss or a rib, is formed by injection molding. The thermoplastic prepreg is formed of a fabric material and a thermoplastic resin material in a sheet shape, and the thermoplastic prepreg can be shaped by heating.

As a convey device which conveys an insert member such as a thermoplastic prepreg, there is known a technique of conveying an insert member such as a thermoplastic prepreg to a heating device and a die by placing the insert member such as the thermoplastic prepreg on convey means such as a conveyor in a horizontal attitude.

In addition, Jpn. Pat. Appin. KOKAI Publication No. H6-270199 discloses a technique in which a convey device, which conveys an insert member, uses a convey head which can hold an insert member such as a thermoplastic prepreg by vacuum suction means or the like. The convey device using this convey head is formed such that the convey device can convey the insert member, with the attitude of this insert member being changed, by rotating and moving a movable arm on which the convey head is provided. Specifically, the convey device is formed such that the convey device can change the attitude of the insert member from a horizontal attitude, in which the major surface direction of the insert member is disposed in a substantially horizontal direction, to a vertical attitude in which the major surface direction is disposed in a substantially gravitational direction.

Besides, Jpn. Pat. Appin. KOKAI Publication No. 2012-200984 discloses a convey device which conveys a sheet, such as a decorative sheet, by vacuum suction means or the like, by holding the sheet in a vertical attitude in which the major surface direction of the sheet is disposed in a gravitational direction.

In the molded article manufacturing apparatus disclosed in the above-described Jpn. Pat. Appin. KOKAI Publication No. H6-270199, there are the following problems. Specifically, in order to change the horizontal attitude of the insert member to the vertical attitude, a step of changing the attitude is needed in the above-described convey device, and there arises such a problem that the productivity of molded articles lowers. In addition, if the insert member is conveyed by changing the attitude of the insert member after the insert member was heated, there is a concern that the insert member, which was heated, is naturally cooled.

Additionally, in the case of heating an insert member such as a thermoplastic prepreg by using a convey device which conveys the insert member in the horizontal attitude, and using the convey device which changes the attitude thereafter, the area of installation of the convey device and heating device needs to be larger than the area of the thermoplastic prepreg. Thus, the area of installation of the molded article manufacturing apparatus becomes large.

Additionally, since the thermoplastic prepreg is heated by the heating device in order to shape the thermoplastic prepreg, the technique of placing the thermoplastic prepreg on the convey means in the horizontal attitude, or the technique of holding it by the convey head, leads to an increase in area of contact with the heated thermoplastic prepreg, and there occurs stringiness or a residue of resin material on the contact surface. Thus, for example, the frequency of maintenance of the convey device increases, resulting in an increase in time during which the operation of the molded article manufacturing apparatus is halted.

Additionally, since the strength of the heated thermoplastic prepreg lowers, it is difficult to change the attitude of the thermoplastic prepreg to a predetermined attitude when the attitude is changed after heating. Moreover, since the step of changing the attitude is needed, there is a problem that the cycle time increases.

Additionally, in the molded article manufacturing apparatus disclosed in the above-described Jpn. Pat. Appin. KOKAI Publication No. 2012-200984, after the sheet is disposed in the die, the sheet is heated by the heating device and the heating device is evacuated from the die. Thus, there occurs such a problem that the cycle time increases and the productivity of molded articles decreases.

This being the case, there is a demand for a molded article manufacturing apparatus which can enhance productivity.

Thus, the object of the present invention is to provide a convey device, a molded article manufacturing apparatus and a method of manufacturing a molded article, which can decrease an area of installation and can enhance productivity.

BRIEF SUMMARY OF THE INVENTION

According to an embodiment, a convey device, which conveys an insert member into a die, includes a holding device configured to hold the insert member in an attitude in which a major surface of the insert member is in a substantially gravitational direction; a convey mechanism configured to convey the insert member to the die, while the insert member is being held in the attitude by the holding device; and a heating device configured to heat the insert member. The insert member can be heated by the heating device before the insert member is disposed in the die.

According to another embodiment, a molded article manufacturing apparatus includes a convey device configured to convey an insert member in an attitude in which a major surface of the insert member is in a substantially gravitational direction; a heating device configured to heat the insert member which has been conveyed in the attitude; and a molding device to which a die is attached, the molding device being configured to mold the insert member which has been conveyed in the attitude. The insert member can be heated by the heating device before the insert member is disposed in the molding device.

According to another embodiment, a method of manufacturing a molded article includes conveying, by a convey device, an insert member to a heating device in an attitude in which a major surface of the insert member is in a substantially gravitational direction; heating, by the heating device, the insert member which has been conveyed in the attitude; conveying, after the heating, the insert member to a molding device to which a die is attached; and molding the insert member by the molding device.

BRIEF DESCRIPTION OF THE SEVERAL VIEWS OF THE DRAWING

FIG. 3 is a side view which schematically illustrates a main structure used in the molded article manufacturing apparatus.

DETAILED DESCRIPTION OF THE INVENTION

A molded article manufacturing apparatus 1 according to a first embodiment of the present invention will be described hereinafter with reference to FIG. 1 to FIG. 4.

Figure 1:
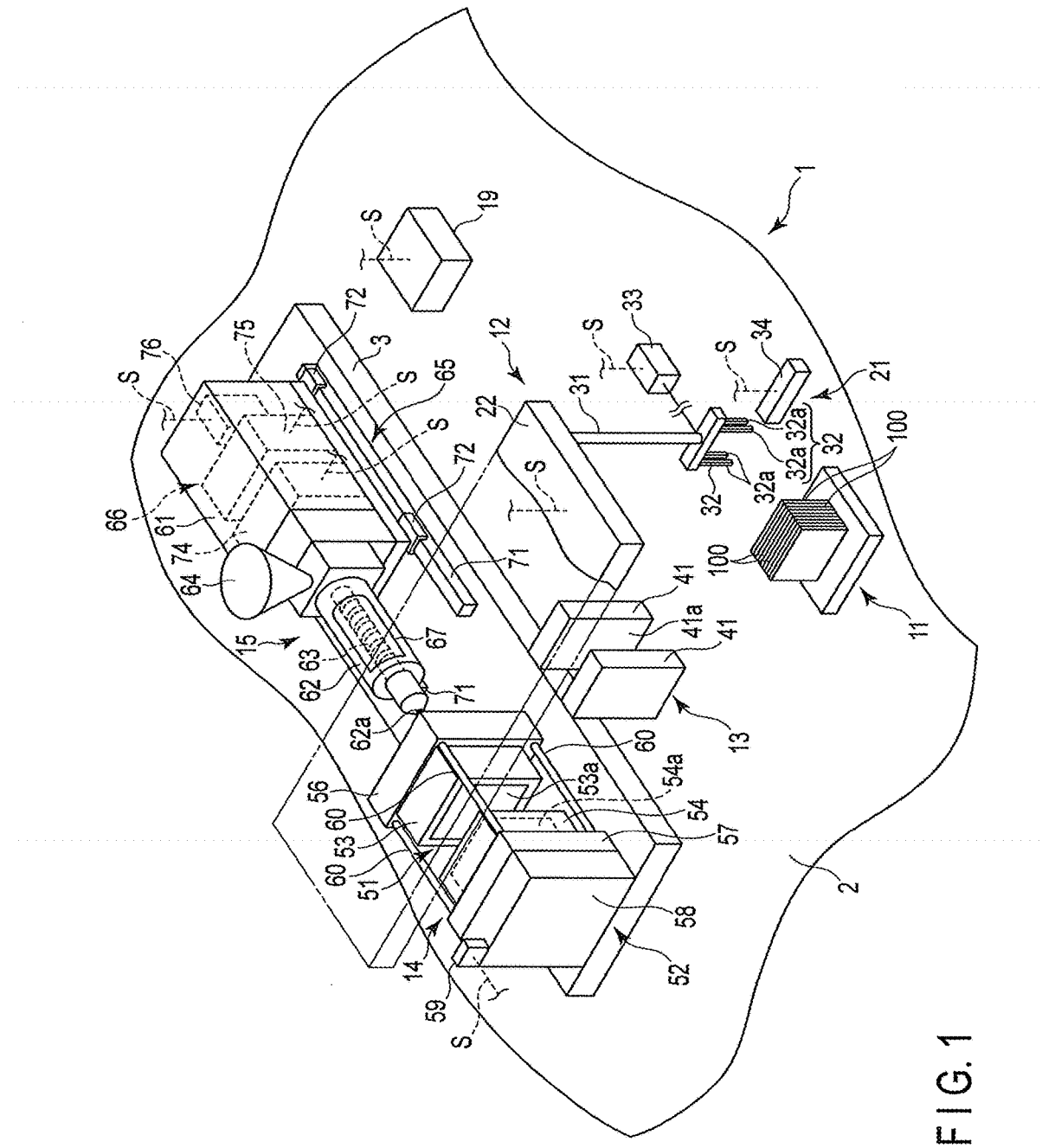
FIG. 1 is a perspective view which schematically illustrates the structure of a molded article manufacturing apparatus according to a first embodiment of the invention.
Figure 2:
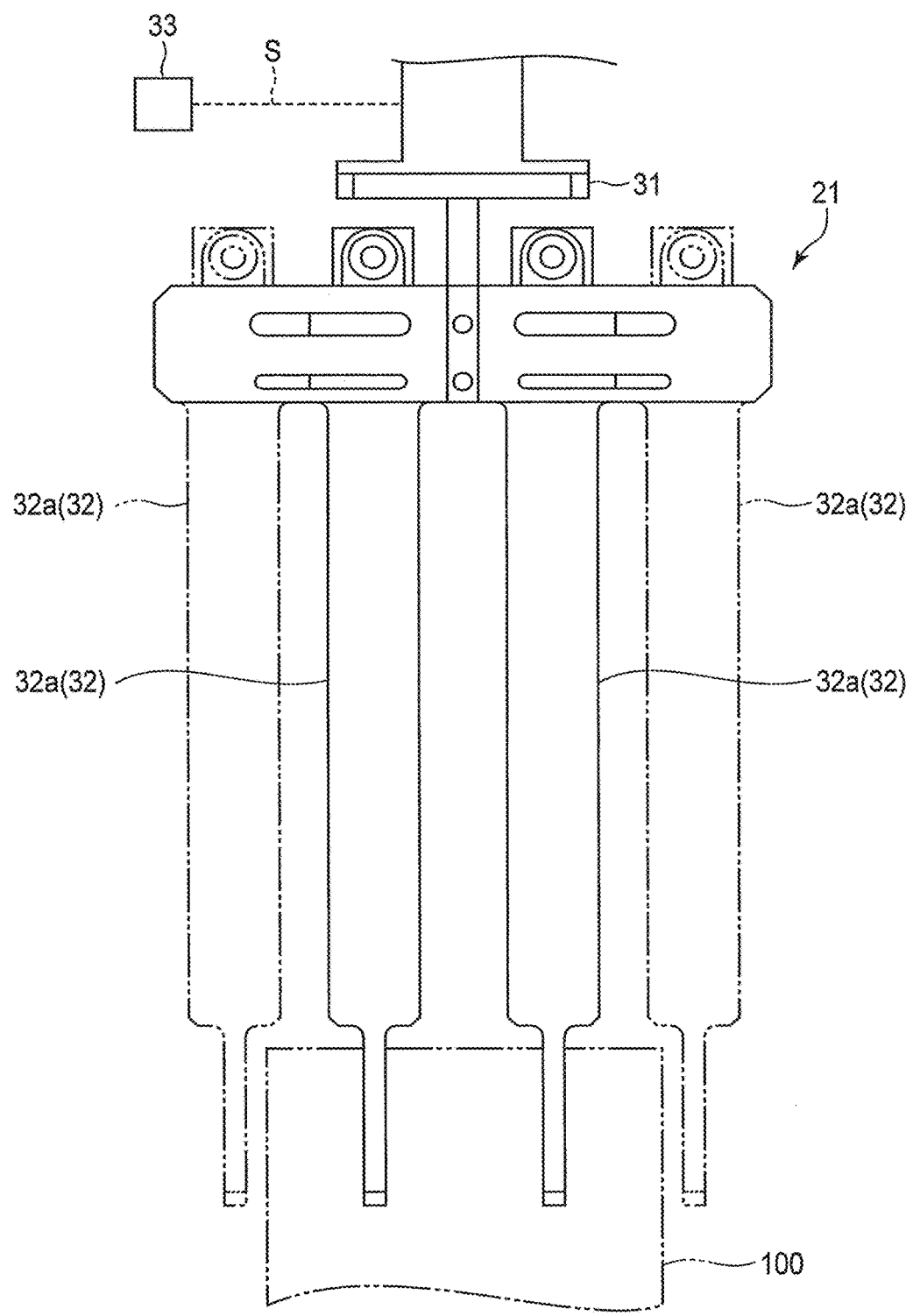
FIG. 2 is a front view which schematically illustrates a main structure used in the molded article manufacturing apparatus.
Figure 4:
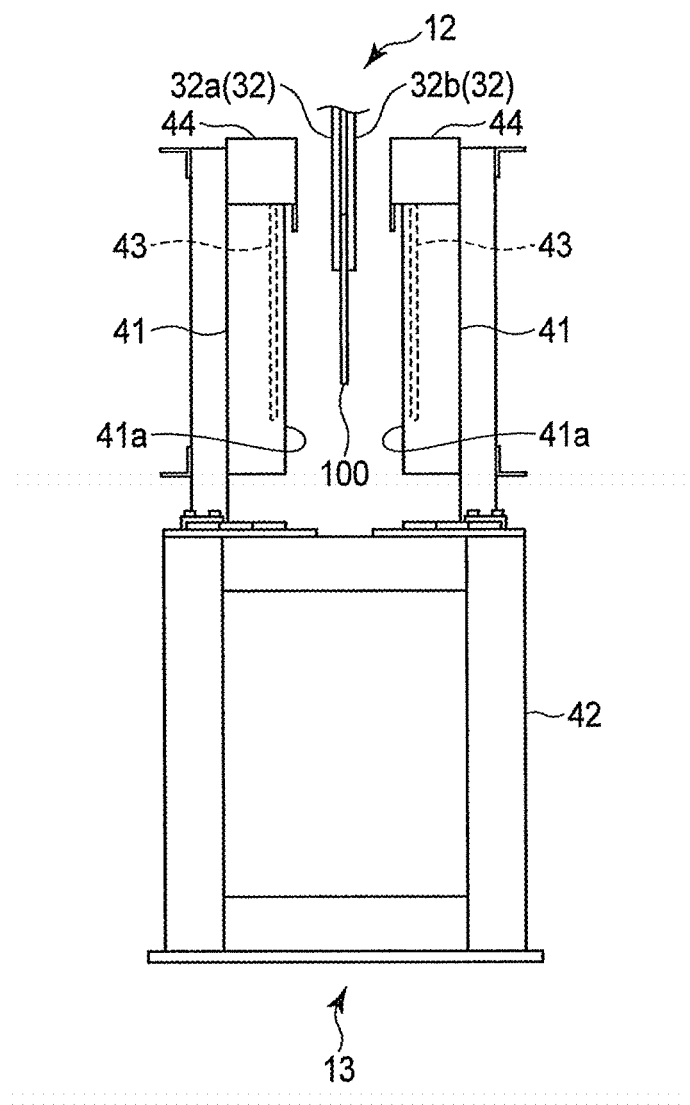
FIG. 4 is a front view which schematically illustrates the structure of a convey device and a heating device which are used in the molded article manufacturing apparatus.

FIG. 1 is a perspective view which schematically illustrates the structure of the molded article manufacturing apparatus 1 according to the first embodiment of the present invention. FIG. 2 is a front view which schematically illustrates a main structure used in the molded article manufacturing apparatus 1, and more specifically, the structure of chucks 32. FIG. 3 is a side view which schematically illustrates the structure of the chucks 32. FIG. 4 is a front view which schematically illustrates the structure of a convey device 12 and a heating device 13 which are used in the molded article manufacturing apparatus 1.

As illustrated in FIG. 1, the molded article manufacturing apparatus 1 includes, for example, a storage section 11, a convey device 12, a heating device 13, a mold device 14, an injection device 15, and a control device 19. The molded article manufacturing apparatus 1 is disposed in an installation range 2 in a factory, etc., and the mold device 14 and injection device 15 are disposed on a base 3. The molded article manufacturing apparatus 1 is formed to be able to manufacture a molded article, by heating a thermoplastic prepreg 100, and thereafter shaping the thermoplastic prepreg 100 by the mold device 14 and injection-molding the thermoplastic prepreg 100 by the injection device 15.

The thermoplastic prepreg 100 is formed in a sheet shape. The thermoplastic prepreg 100 is formed of a fabric material, such as glass or carbon, and a thermoplastic resin material. The thermoplastic prepreg 100 is formed to have a rectangular plan-view shape in FIG. 1, but the thermoplastic prepreg 100 is formed in a shape which is suitable for the shaping into the shape of a molded article. The thermoplastic prepreg 100 is formed, for example, in a rectangular shape, a triangular shape, an elliptic shape, or a different shape in which the molded article can be formed. In addition, the thermoplastic prepreg 100 is an example of an insert member.

The storage section 11 is formed to be able to store a plurality of thermoplastic prepregs 100. The storage section 11 is formed to be able to store the thermoplastic prepregs 100, for example, in a vertical attitude. In the meantime, the storage section 11 may be formed, for example, such that the storage section 11 stores thermoplastic prepregs 100 in a horizontal attitude and can change the attitude of the thermoplastic prepregs 100 from the horizontal attitude to the vertical attitude.

Here, the vertical attitude of the thermoplastic prepreg 100 is an attitude in which a major surface of the thermoplastic prepreg 100 is in a substantially gravitational direction, that is, an attitude in which the major surface of the thermoplastic prepreg 100 extends in an up-and-down direction, or an attitude equivalent to these attitudes. In addition, the horizontal attitude of the thermoplastic prepreg 100 is an attitude in which a major surface of the thermoplastic prepreg 100 is in a substantially horizontal direction, that is, an attitude in which the major surface of the thermoplastic prepreg 100 extends along the surface of installation of the molded article manufacturing apparatus 1, or an attitude equivalent to these attitudes.

The convey device 12 is formed such that the thermoplastic prepregs 100 can be successively conveyed in their vertical attitude from the storage section 11 of thermoplastic prepregs 100 to the heating device 13 and mold device 14. Specifically, the convey device 12 includes, for example, a chuck device 21 and a convey mechanism 22.

The chuck device 21 includes, for example, a support portion 31 which is provided on the convey mechanism 22, a plurality of chucks 32, opening/closing means 33 for opening/closing the chucks 32, and a cooling device 34. The chuck device 21 is formed to be able to clamp the thermoplastic prepreg 100 at a plurality of positions by the plural chucks 32. The chuck device 21 is an example of a holding device which holds the thermoplastic prepreg 100.

As is illustrated in FIG. 2 and FIG. 3, the support portion 31 is formed to be able to support the plural chucks 32. The support portion 31 is formed to be movable by the convey mechanism 22. As shown in FIG. 2 and FIG. 3, the chuck 32 is formed such that the chuck 32 can open/close its distal end portion by being driven by the opening/closing means 33. The chuck 32 is formed to have a narrow width of its distal end so as to hold at least thermoplastic prepreg 100. In addition, the plural chucks 32 are supported on the support portion 31 such that the distance between the plural chucks 32 can be adjusted, as indicated by solid lines and two-dot-and-dash lines in FIG. 2.

The chuck 32 includes, for example, a fixed claw portion 32a provided on the support portion 31, and a movable claw portion 32b which moves toward or away from the fixed claw portion 32a. The movable claw portion 32b is driven by the opening/closing means 33. The fixed claw portion 32a and movable claw portion 32b are formed of, for example, a material with good heat resistance. The fixed claw portion 32a and movable claw portion 32b are formed of, for example, stainless steel material, aluminum material, etc.

In the state in which an end portion of the thermoplastic prepreg 100 is positioned between the distal ends of the fixed claw portion 32a and movable claw portion 32b, the movable claw portion 32b is driven by the opening/closing means 33, and the chuck 32 is set in the closed state. The chuck 32 is formed to be able to hold the thermoplastic prepreg 100 by the closed state being maintained.

The opening/closing means 33 is a driving source for opening/closing the chucks 32 by moving the movable claw portions 32b and, for example, a pneumatic cylinder or the like is used as the opening/closing means 33. The opening/closing means 33 is electrically connected to the control device 19 via a signal line S.

The cooling device 34 is formed to be able to cool the chucks 32. The cooling device 34 is formed to be able to cool the chucks 32, for example, by jetting air to the chucks 32. The cooling device 34 is electrically connected to the control device 19 via a signal line S.

The cooling device 34 is formed to be able to cool at least those parts of the fixed claw portion 32a and movable claw portion 32b, which come in contact with the thermoplastic prepreg 100, and peripheral areas of such parts. The cooling device 34 is supported by the support portion 31, or is disposed at such a position that the cooling device 34 can cool the chucks 32 in a fabrication step before the chucks 32 move to the storage section 11. Incidentally, the cooling device 34 may be configured such that the cooling device 34 is positioned above the heating device 13 and to perform cooling as long as the thermoplastic prepreg 100 is not affected, even while the thermoplastic prepreg 100 is being heated.

The convey mechanism 22 is a mechanism for successively conveying the chucks 32 of the chuck device 21 to the storage section 11, heating device 13 and mold device 14 and, for example, the convey mechanism 22 is formed to be able to slidably move the support portion 31. The convey mechanism 22 is, for example, a rail. Incidentally, the convey mechanism 22 may be an articulated robot, etc. The convey mechanism 22 is electrically connected to the control device 19 via a signal line S.

As illustrated in FIG. 1 and FIG. 4, the heating device 13 includes, for example, a pair of heating units 41 which are opposed to each other with a distance therebetween, the pair of heating units 41 being capable of heating the thermoplastic prepreg 100, and a support unit 42 which supports the heating units 41. In the paired heating units 41, for example, heating surfaces 41a for heating the thermoplastic prepreg 100 are disposed along the major surfaces of the thermoplastic prepreg 100.

Specifically, the paired heating units 41 are disposed, for example, in the vertical attitude (e.g. a rectangular parallelepiped elongated in a substantially gravitational direction), like the thermoplastic prepreg 100. The paired heating units 41 are opposed to each other with such an interval that parts of the distal end portions of the fixed claw portion 32a and movable claw portion 32b of the chucks 32 and the thermoplastic prepreg 100, which is held by the chucks 32, can pass through.

For example, the heating units 41 are formed such that one or plural infrared heaters 43 are provided on the mutually opposed heating surfaces 41a of the heating units 41, thus being able to heat up to a predetermined temperature the thermoplastic prepreg 100 which passes between the heating units 41 or are at rest between the heating units 41. Incidentally, here, the predetermined temperature means, for example, such a temperature that the thermoplastic prepreg 100 can be shaped in the mold device 14. The heating unit 41 is provided with a cover 44 for heat shielding, for example, in such a range above the heating unit 41 as to be opposed to the chuck 32 and not opposed to the thermoplastic prepreg 100.

The mold device 14 includes an openable/closable die 51, and a mold clamping device 52 which opens/closes the die 51.

The die 51 includes, for example, a fixed die 53 and a movable die 54. The movable die 54 is formed to be movable relative to the fixed die 53. The fixed die 53 and movable die 54 have, in their mutually opposed surfaces, cavities 53a and 54a which are formed in shapes for forming a molded article. In the die 51, in its closed state, a space in a shape of the molded article is formed by the cavities 53a and 54a of the fixed die 53 and movable die 54.

The mold clamping device 52 is formed to be able to open/close the die 51, and to be able to perform mold clamping. The mold clamping device 52 includes, for example, a fixed plate 56, a movable plate 57 which is movable relative to the fixed plate 56, a toggle mechanism 58 which moves the movable plate 57, a driving source 59 which drives the toggle mechanism 58, and a plurality of tie-bars 60 which guide movement of the movable plate 57 relative to the fixed plate 56. The mold clamping device 52 is an example of a molding device which forms a molded article.

The fixed plate 56 is formed to be able to support the fixed die 53. The movable plate 57 is formed to be able to support the movable die 54. By being driven by the driving source 59, the toggle mechanism 58 advances/retreats the movable plate 57, relative to the fixed plate 56. The driving source 59 is formed to be able to drive the toggle mechanism 58. The driving source 59 is electrically connected to the control device 19 via a signal line S. The plural tie-bars 60 are formed to be able to guide the movable plate 57 such that the movable plate 57 linearly advances/retreats relative to the fixed plate 56. The plural tie-bars 60 are provided at four locations, for example, so as to span between the fixed plate 56 and movable plate 57.

The injection device 15 includes, for example, a housing 61, a cylinder 62, a screw 63, a hopper 64, moving means 65, a driving device 66, and a cylinder heating device 67. The injection device 15 is an example of a molding device configured to inject a resin material into the die 51 of the die device 14, thereby forming, together with the mold clamping device 52, a molded article.

The housing 61 is formed, for example, such that the housing 61 can support the cylinder 62, screw 63 and hopper 64, and can accommodate the driving device 66 therein. The cylinder 62 accommodates the screw 63 therein. The cylinder 62 includes an injection nozzle 62*a* at a distal end thereof. The injection nozzle 62*a* is formed to be connectable to a gate formed in the die 51. The screw 63 is formed to be rotatable within the cylinder 62 and to be advancible/retreatable relative to the cylinder 62.

The hopper 64 stores a resin material to be melted, with which injection molding is performed. The hopper 64 is formed to be able to supply the stored resin material into the cylinder 62.

The moving means 65 includes, for example, a plurality of rails 71 which are disposed on the base 3 and extend towards the fixed die 53 and fixed plate 56, and a plurality of guides 72 which are provided under the housing 61 and are slidingly movable on the rails 71. The moving means 65 is formed to be able to advance/retreat the housing 61 and the respective structures supported on the housing 61 along the rails 71 relative to the die device 14, by the guides 72 being guided on the rails 71.

The driving device 66 includes, for example, a first driving device 74 configured to rotate the screw 63, a second driving device 75 configured to advance/retreat the screw 63 relative to the cylinder 62, and a third driving device 76 configured to advance/retreat the hosing 61 along the rails 71 relative to the die device 14.

The first driving device 74 is formed to be able to supply a fixed amount of resin material which is supplied from the hopper 64, by rotating the screw 63. The first driving device 74, second driving device 75 and third driving device 76 are electrically connected to the control device 19 via signal lines S.

The cylinder heating device 67 is formed to be able to heat the cylinder 62. The cylinder heating device 67 is attached to the cylinder 62. The cylinder heating device 67 is formed to be able to melt the resin material supplied from the hopper 64, by heating the cylinder 62. The cylinder heating device 67 is electrically connected to the control device 19 via a signal line S.

The control device 19 is formed to be able to control the convey device 12, die device 14 and injection device 15. Specifically, the control device 19 is formed to be able to control the moving operation of the chucks 32 (support portion 31), by controlling the convey mechanism 22. In addition, the control device 19 is formed to be able to detect the position of the support portion 31 of the convey device 12.

The control device 19 is formed to be able to control the opening/closing operation of the chucks 32, by controlling the opening/closing means 33. The control device 19 is formed to be able to control the cooling of the chucks 32, by controlling the cooling device 34.

The control device 19 is formed to drive the toggle mechanism 58 by controlling the driving source 59, thereby being able to control the advancing/retreating operation of the movable die 54 (movable plate 57). The control device 19 is formed to control the first driving device 74, second driving device 75 and third driving device 76, thereby being able to control the rotational operation and advancing/retreating operation of the screw 63 and the advancing/retreating operation of the housing 61 (the advancing/retreating operation of the injection device 15). The control device 19 is formed to be able to control the heating operation of the cylinder 62 by controlling the cylinder heating device 67.

Next, a description is given of a method of manufacturing a molded article by using the molded article manufacturing apparatus 1 having the above-described structure.

To start with, the chucks 32 are moved to the storage section 11, and the chucks 32 are set in the open state. In the meantime, when the thermoplastic prepreg 100 was conveyed to the heating device 13 before this cycle, the chucks 32 are cooled by the cooling device 34.

Next, as illustrated in FIG. 2 and FIG. 3, the chucks 32 are further moved, and the distal ends of the fixed claw portions 32*a* and movable claw portions 32*b* are positioned at the peripheral edge (edge portion, end portion) of the thermoplastic prepreg 100. Then, as illustrated in FIG. 2 and FIG. 3, the chucks 32 are set in the closed state by moving the movable claw portions 32*b*, as indicated by a two-dot-and-dash line, and the thermoplastic prepreg 100 is held by the chucks 32.

Next, the chucks 32 are moved, the thermoplastic prepreg 100 is moved into between the paired heating units 41, and the thermoplastic prepreg 100 is heated up to a predetermined temperature. Subsequently, the chucks 32 are moved, the thermoplastic prepreg 100 is conveyed to the die 51 (the mold clamping device 52 to which the die 51 is attached), and the thermoplastic prepreg 100 is disposed (inserted) in the die 51 (mold clamping device 52). At this time, for example, the thermoplastic prepreg 100 is positioned by fixing the thermoplastic prepreg 100 at positioning pins provided on the fixed die 53 or movable die 54. In the meantime, the thermoplastic prepreg 100 is set in a softened state by being passed between the paired heating units 41 of the heating device 13 or by being stopped between the paired heating units 41 of the heating device 13.

Next, the toggle mechanism 58 is driven, the movable die 54 is moved toward the fixed die 53, and mold clamping is performed. Thereby, the thermoplastic prepreg 100 is pressed by the die 51 (the mold clamping device 52 to which the die 51 is attached) and is shaped in accordance with the shapes of the cavities 53*a* and 54*a*.

In conjunction with this, the housing 61 is moved, the injection nozzle 62*a* is connected to the gate that is formed in the fixed die 53, and the resin material, which is supplied in the cylinder 62 from the hopper 64 and is melted, is injected via the gate. Thereby, the resin material is injected in the cavity 53*a*, 54*a*, and the resin material is supplied in the shape of the cavity 53*a*, 54*a* and is molded as one body with the shaped thermoplastic prepreg 100.

Next, the shaped thermoplastic prepreg 100 and the injected resin material are cooled in the die 51, and a molded article is formed. Then, the movable die 54 is moved, the die 51 is set in the open state, and the molded article is taken out of the die 51 by an extrusion pin that is provided on the fixed die 53 or movable die 54.

In addition, the chucks 32 are cooled by the cooling device 34 during a period from the mold-clamping to the take-out of the molded article, a thermoplastic prepreg 100 is conveyed to the heating device 13 once again, and the thermoplastic prepreg 100 for use in the next molding is heated. Subsequently, the same fabrication steps are repeated. By the repetition of these fabrication steps, molded articles are successively manufactured.

According to the molded article manufacturing device 1 with the above-described structure, the heating device 13 is configured such that the paired heating units 41 are provided in a vertical attitude with their heating surfaces 41*a* being provided to extend in the up-and-down direction, and the heating device 13 heats the thermoplastic prepreg 100 in the vertical attitude. By this configuration, the heating device 13 may have a width which corresponds to the width of the heating unit 41 and an interval between the opposed heating units 41 through which the thermoplastic prepreg 100 and chucks 32 can pass, and the area of installation can be reduced. As a result, the area of installation of the molded article manufacturing apparatus 1 can be reduced. In particular, even if the area of the thermoplastic prepreg 100 is large, the thermoplastic prepreg 100 can be heated by increasing the height of the heating units 41, without increasing the area of installation of the heating device 13. In addition, since the thermoplastic prepreg 100 is conveyed in the vertical attitude (in the attitude in which the major surface of the thermoplastic prepreg 100 is in the substantially gravitational direction), the thermoplastic prepreg 100 is heated by simply disposing the heating device 13 so as to sandwich the convey path of the thermoplastic prepreg 100, without changing the attitude of the thermoplastic prepreg 100. Thereby, the thermoplastic prepreg 100 can easily be heated.

Additionally, by the configuration in which the thermoplastic prepreg 100 is conveyed by the convey device 12 to the heating device 13 and mold device 14, there is no need to additionally provide the heating device 13 with a convey device such as a slide device of the thermoplastic prepreg 100 for heating. In addition, at the time of conveying, there is no need to provide a wire net or a heat insulation sheet, and the thermoplastic prepreg 100 can be uniformly heated.

Additionally, the thermoplastic prepreg 100 is clamped and held by the chucks 32 and, in this state, conveyed to the heating device 13 and heated. Thus, those portions of the thermoplastic prepreg 100, which are held by the chucks 32, are covered with the distal ends of the fixed claw portions 32a and movable claw portions 32b of the chucks 32, and, therefore, infrared is not directly radiated on those portions. Specifically, even if the thermoplastic prepreg 100 is passed through the heating device 13 by the chucks 32 and its surfaces opposed to the heating units 41 are heated, heat can be prevented from being directly conveyed from the heating units 41 of the heating device 13 to those portions of the thermoplastic prepreg 100, which are held by the chucks 32.

Thus, even if the thermoplastic prepreg 100 is heated by the heating units 41 of the heating device 13, those portions of the thermoplastic prepreg 100, which are covered by the chucks 32, are in a semi-molten state or a non-molten state. When the chucks 32 are set in the open state, it is possible to prevent adhesion or stringiness of the thermoplastic resin of the thermoplastic prepreg 100 onto the fixed claw portions 32a and movable claw portions 32b.

Additionally, it is possible to prevent misalignment and falling of the thermoplastic prepreg 100 due to melting of the resin material, and, as a result, a stable molding cycle can be realized. Besides, the thermoplastic prepreg 100 can be conveyed by the convey device 12 to the heating device 13 and mold device 14, and the molding cycle can be shortened. Incidentally, it is preferable to dispose those portions of the thermoplastic prepreg 100, which are in the semi-molten or non-molten state, at such a position that bending is not applied at the time of shaping in the die 51.

Furthermore, since the chucks 32 are cooled by the cooling device 34, even if the chucks 32 are heated by being passed through the heating device 13 in the previous cycle, the temperature can be lowered as much as possible in the next cycle. Thereby, it becomes possible to prevent as much as possible the chucks 32 from heating those portions of the thermoplastic prepreg 100, which come in contact with the chucks 32.

In this manner, by conveying the thermoplastic prepreg 100 by the chucks 32, it becomes possible to make the heating temperature of those portions of the thermoplastic prepreg 100, which are held by the chucks 32, lower than the heating temperature of the other portions, and to perform continuous conveying. As a result, the molded article manufacturing apparatus 1 can perform a stable molding cycle and can shorten the molding cycle.

Additionally, the thermoplastic prepreg 100 can be stored in the vertical attitude in the storage section 11, and can be conveyed by the convey device 12, with the vertical attitude being kept, from the storage section 11 to the heating device 13 and mold device 14. Thereby, the structure of the convey device 12 can be simplified, without the need to change the attitude of the thermoplastic prepreg 100 from the horizontal attitude to the vertical attitude by the convey device 12.

Additionally, for example, a large number of horizontal-disposition-type molding apparatuses, such as injection molding apparatuses, which include mold clamping devices 52 and injection devices 15, have been manufactured. In such molding apparatuses, the cavity 53a of the fixed die 53 is open in a direction perpendicular to the up-and-down direction. Thus, the attitude of the thermoplastic prepreg 100 in the cavity 53a of the fixed die 53 becomes the vertical attitude. Since the thermoplastic prepreg 100 is stored in the storage section 11 in the vertical attitude, there is no need to change the attitude of the thermoplastic prepreg 100 during conveyance from the storage section 11 to the cavity 53a of the fixed die 53.

In other words, a step of changing the attitude of the thermoplastic prepreg 100 becomes unnecessary.

Additionally, before the thermoplastic prepreg 100 is disposed in the die 15 (mold clamping device 52), the thermoplastic prepreg 100 is heated by the heating device 13. Thereby, it becomes unnecessary to perform a fabrication step of heating the thermoplastic prepreg 100 by the heating device 13 after the thermoplastic prepreg 100 is conveyed in the die 51 (mold clamping device 52), and then evacuating the heating device 13 from the die 51 (mold clamping device 52). This suggests that, in the present invention, the thermoplastic prepreg 100 can be heated by the heating device 13 before the thermoplastic prepreg 100 is disposed in the die 15 (mold clamping device 52).

Additionally, during the period from the mold clamping to the take-out of the molded article, the convey device 12 is operated in parallel with the operation of the mold clamping device 52 (mold device 14) and the operation of the injection device 15. Thereby, during the period from the mold clamping operation to the take-out operation of the molded article, a thermoplastic prepreg 100 for use in the next molding can be heated by the heating device 13, and the heated thermoplastic prepreg 100 (for use in the next molding) can be conveyed to the vicinity of the mold clamping device 52 (mold device 14). Thus, immediately after the end of the take-out of the molded article, the next molding can be performed. Specifically, the thermoplastic prepreg 100 can be heated by the heating device 13 before the thermoplastic prepreg 100 is disposed in the die 15 (mold clamping device 52), and the heated thermoplastic prepreg 100 can be disposed in the die 15 (mold clamping device 52). Thus, in the molding process, the step which is performed by using the mold clamping device 52 (mold device 14) and the step which is performed by using the injection device 15 can be performed in parallel with the step which is performed by using the convey device 12 and heating device 13.

Therefore, since the number of fabrication steps at the time of forming a molded article in the molded article manufacturing apparatus 1 can be reduced, the productivity of molded articles can be enhanced, and the molding cycle can be shortened.

Additionally, deformation of the sheet-shaped thermoplastic prepreg 100 can be suppressed. This point is concretely described. The thermoplastic prepreg 100 has a sheet shape. Thus, for example, if the thermoplastic prepreg 100 is stored in the horizontal attitude, it is thought that the thermoplastic prepreg 100 would be bent, with those portions of the thermoplastic prepreg 100, which are fixed to the chucks 32, acting as fulcra.

However, in the present embodiment, the sheet-shaped thermoplastic prepreg 100 is stored in the vertical attitude, and the chucks 32 hold the thermoplastic prepreg 100, and thereby the thermoplastic prepreg 100 is set in a state in which the thermoplastic prepreg 100 is suspended by the chucks 32 in the attitude (vertical attitude) in the up-and-down direction. It is possible, therefore, to suppress deformation of the thermoplastic prepreg 100 due to gravity while the thermoplastic prepreg 100 being conveyed.

In particular, as in the present embodiment, if the thermoplastic prepreg 100 is heated by the heating device 13, since the thermoplastic prepreg 100 becomes soft (softened), it is effective to convey the thermoplastic prepreg 100 in the vertical attitude.

Additionally, in this embodiment, after the thermoplastic prepreg 100 is softened by the heating, the thermoplastic prepreg 100 is conveyed into the cavity 53a of the fixed die 53 without the attitude of the thermoplastic prepreg 100 being changed. It is thus possible to suppress deformation of the thermoplastic prepreg 100 at the time of conveying. Besides, by virtue of these, the occurrence of a defective molded article can be suppressed.

As has been described above, according to the molded article manufacturing apparatus 1 relating to the embodiment of the present invention, the area of installation of the molded article manufacturing apparatus 1 can be reduced and the productivity can be enhanced by the convey device 12 and heating device 13, which can convey and heat the thermoplastic prepreg 100 in the vertical attitude.

(Second Embodiment)

Next, a molded article manufacturing apparatus 1A according to a second embodiment of the present invention will be described with reference to FIG. 5 to FIG. 8.

Figure 5:
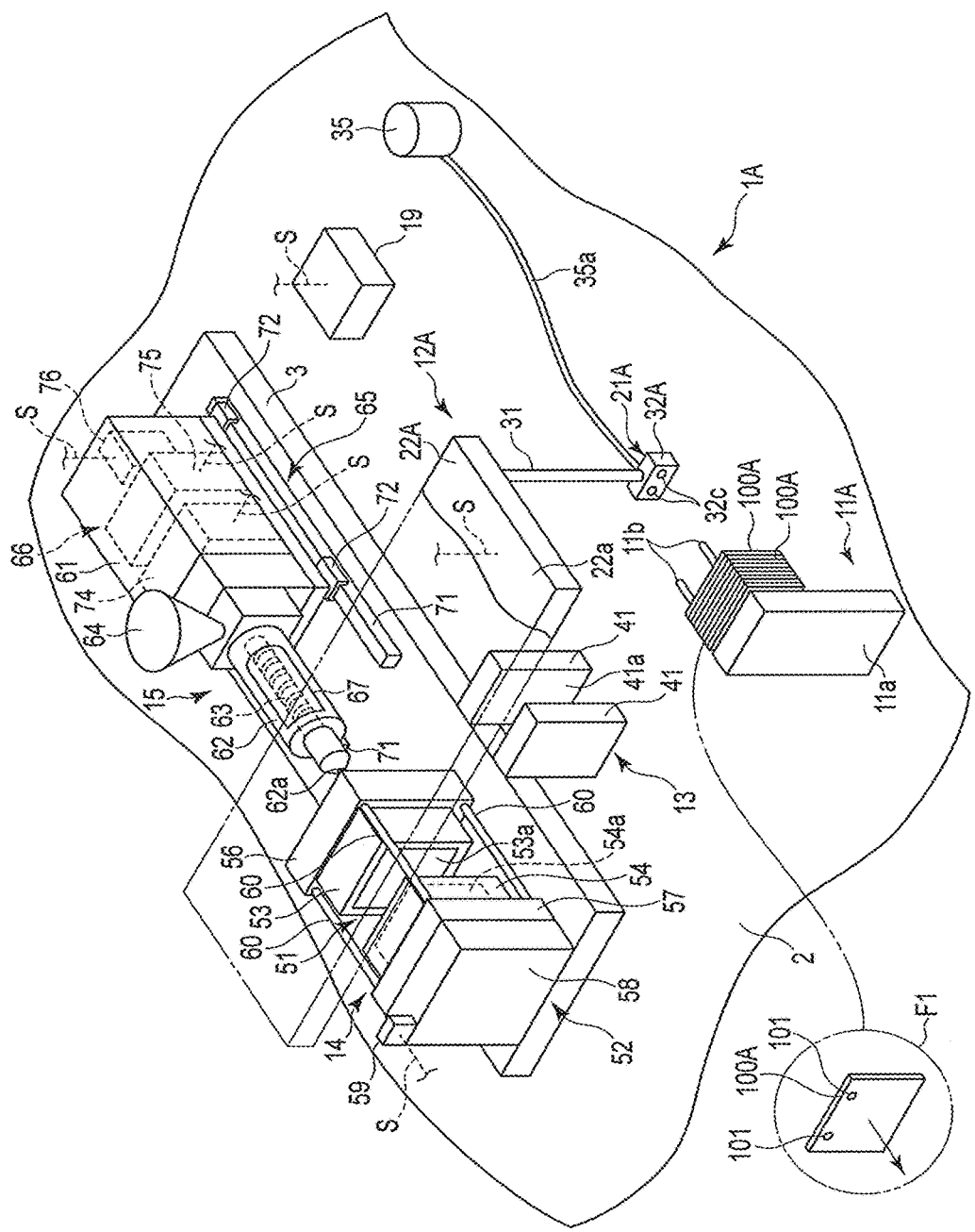
FIG. 5 is a perspective view which schematically illustrates the structure of a molded article manufacturing apparatus according to a second embodiment of the invention.
Figure 6:
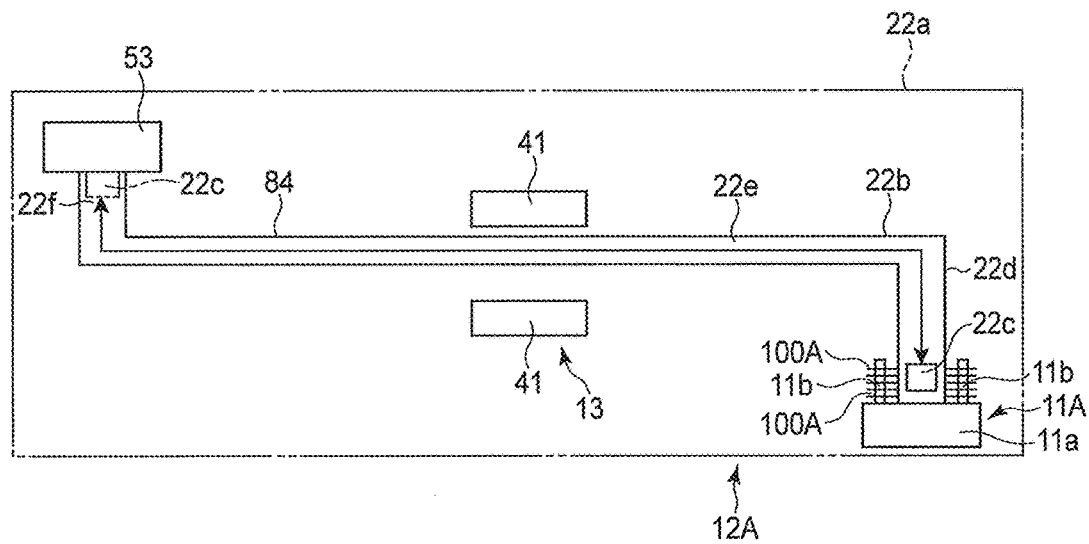
FIG. 6 is an explanatory view which schematically illustrates the structure of a convey device which is used in the molded article manufacturing apparatus.
Figure 7:
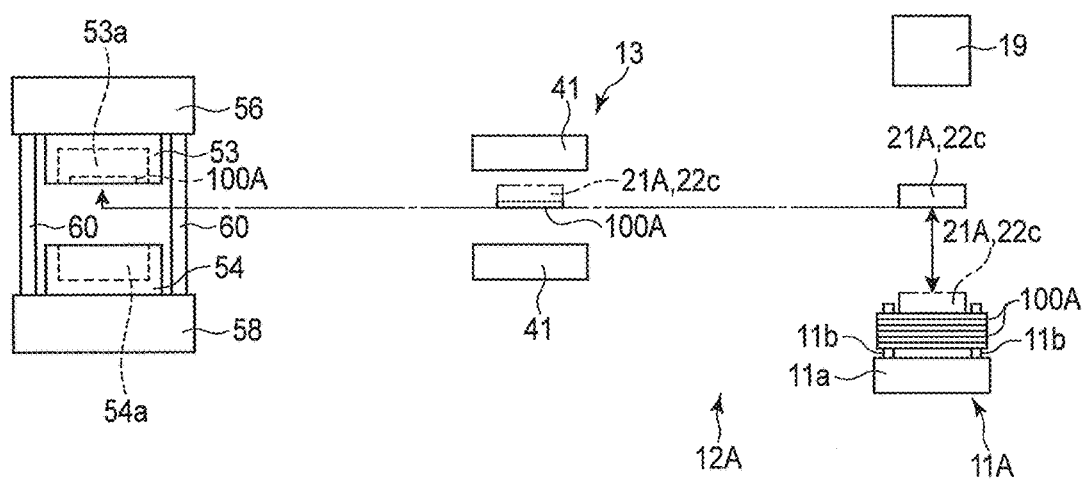
FIG. 7 is an explanatory view which schematically illustrates a main structure used in the molded article manufacturing apparatus.
Figure 8:
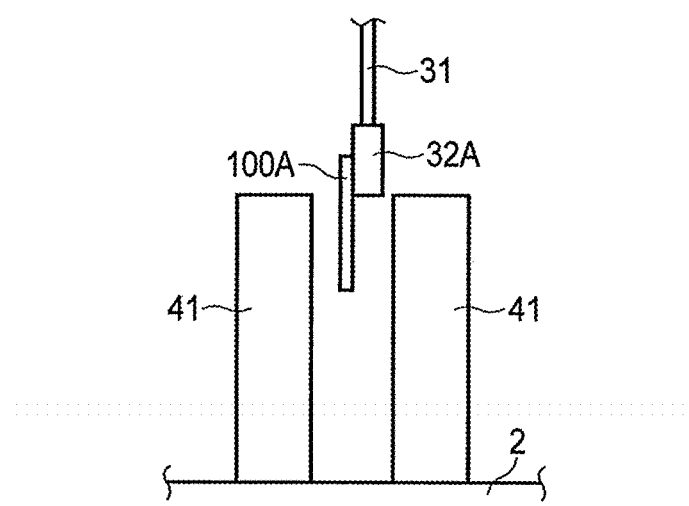
FIG. 8 is a front view which schematically illustrates the structure of the convey device and a heating device which are used in the molded article manufacturing apparatus.

FIG. 5 is a perspective view which schematically illustrates the structure of the molded article manufacturing apparatus 1A according to the second embodiment of the present invention. FIG. 6 is an explanatory view which schematically illustrates the structure of a convey device 12A which is used in the molded article manufacturing apparatus 1A. FIG. 7 is an explanatory view which schematically illustrates the structure of the convey device 12A, heating device 13 and mold device 14, which are used in the molded article manufacturing apparatus 1A. FIG. 8 is a front view which schematically illustrates the structure of the convey device 12A and heating device 13.

Incidentally, in the molded article manufacturing apparatus 1A according to the second embodiment, the same structure as in the molded article manufacturing apparatus 1 according to the above-described first embodiment is denoted by like reference numerals, and a detailed description thereof is omitted.

The molded article manufacturing apparatus 1A includes, for example, a storage section 11A, a convey device 12A, a heating device 13, a mold device 14, an injection device 15, and a control device 19. The molded article manufacturing apparatus 1A is disposed in an installation range 2 in a factory, etc., and the mold device 14 and injection device 15 are disposed on a base 3. The molded article manufacturing apparatus 1A is formed to be able to manufacture a molded article, by heating an insert member 100A, and thereafter injection-molding the insert member 100A by the injection device 15.

The insert member 100A is formed, for example, in a sheet shape, as illustrated in a range F1 indicated by a two-dot-and-dash line in FIG. 5. Through-holes 101 are formed in an upper end portion of the insert member 100A. For example, a pair of through-holes 101 are formed in the insert member 100A. The insert member 100A is formed of, for example, a thermoplastic prepreg 100, a metallic material, or a thermoplastic resin material.

The storage section 11A is formed to be able to store a plurality of insert members 100A. The storage section 11A is formed to be able to store the insert member 100A, for example, in a vertical attitude. The storage section 11A includes a base portion 11a and hold portions 11b. The base portion 11a is, for example, a wall extending in the gravitational direction, and the hold portions 11b are a pair of cylindrical rod members extending in the horizontal direction.

The outside diameter of the hold portion 11b is formed to be less than the inside diameter of the through-hole 101 of the insert member 100A. In addition, the paired hold portions 11b are provided on the base portion 11a with such an arrangement that their axes are coaxial with the axes of the paired through-holes 101. The storage section 11A is formed to be able to hold the insert member 100A by inserting the hold portions 11b into the through-holes 101 provided in the insert member 100A illustrated in enlarged scale by the two-dot-and-dash line in FIG. 5. In addition, the storage section 11A is formed to be able to hold a plurality of insert members 100A on the hold portions 11b.

The convey device 12A is formed such that the insert members 100A can be successively conveyed in their vertical attitude from the storage section 11A of insert members 100A to the heating device 13 and mold device 14. Specifically, the convey device 12A includes, for example, a chuck device 21A and a convey mechanism 22A.

The chuck device 21A includes, for example, a support portion 31 which is provided on the convey mechanism 22A, a chuck 32A, and a vacuum generation pump 35. The chuck device 21A is formed to be able to fix the insert member 100A on the chuck 32A, by sucking the insert member 100A onto the chuck 32A by a negative pressure. The chuck device 21A is an example of a holding device which holds the insert member 100A such as thermoplastic prepreg 100.

The support portion 31 is, for instance, a cylindrical rod member, and is formed to be able to support the chuck 32A. The support portion 31 is coupled to the convey mechanism 22A. Suction holes 32c, which cause a negative pressure to act on the insert member 100A at a time of suction, are formed in the chuck 32A. The chuck 32A is connected to the vacuum generation pump 35 via a piping 35a or the like. By driving the vacuum generation pump 35, a negative pressure acts on the suction holes 32c of the chuck 32A via the piping 35a. The piping 35a has, for example, flexibility, and has such a sufficient length as not to hinder movement of the chuck 32A.

The convey mechanism 22A is formed to be able to convey the insert member 100A which is held by the chuck 32A, by moving the support portion 31 and chuck 32A. As illustrated in FIG. 6, the convey mechanism 22A includes, for example, a base unit 22a, a convey rail 22b provided on the base unit 22a, and a moving unit 22c which is movably provided on the convey rail 22b.

The base unit 22a is provided on the molded article manufacturing apparatus 1A, and is provided over the range of conveyance of the insert member 100A. The base unit 22a is provided such that the plane direction of the lower surface thereof extends in the horizontal direction. Incidentally, the base unit 22a may be, for example, a ceiling of a building structure such as a factory. The convey rail 22b is formed along the plane direction of the lower surface of the base unit 22a. The convey rail 22b is fixed to, for example, the lower surface of the base unit 22a.

The convey rail 22b has such a shape as to be able to convey the insert member 100A from the storage section 11A into the cavity 53a of the fixed die 53 via the heating device 13. Specifically, as illustrated in FIG. 6, the convey rail 22b includes a first rail portion 22d, a second rail portion 22e and a third rail portion 22f.

The first rail portion 22d is provided to extend, for example, in parallel to the direction of extension of the hold portions 11b. The first rail portion 22d is provided to extend over such a length as to enable movement from the base portion 11a of the storage section 11A to a position beyond the distal ends of the hold portions 11b. Thereby, even if the insert member 100A is positioned near the base portion 11a, the first rail portion 22d can guide the chuck 32A to the insert member 100A. Specifically, in order to detach the insert member 100A from the storage section 11A, the first rail portion 22d constitutes a part of the convey rail 22b, which is provided to extend in parallel to the hold portions 11b.

The second rail portion 22e is, for example, integrally coupled to the first rail portion 22d. The second rail portion 22e is provided to extend, for example, in a direction perpendicular to the first rail portion 22d. The second rail portion 22e is provided on the base unit 22a, for example, with such an arrangement as to convey the insert member 100A, which was detached from the storage section 11A, from the first rail portion 22d to the vicinity of the cavity 53a of the fixed die 53 over a shortest distance.

Specifically, as illustrated in FIG. 6, the second rail portion 22e is provided to extend from an end portion of the first rail portion 22d to a position opposed to the cavity 53a of the fixed die 53. In addition, the second rail portion 22e is disposed between the paired heating units 41 of the heating device 13.

In order to convey the insert member 100A to the vicinity of the fixed die 53, the second rail portion 22e constitutes a part of the convey rail 22b, which is provided to extend in a direction perpendicular to the first rail portion 22d.

The third rail portion 22f is, for example, integrally coupled to the second rail portion 22e. The third rail portion 22f is provided to extend, for example, in a direction perpendicular to the second rail portion 22e. The third rail portion 22f is provided to extend from the second rail portion 22e in a direction toward the cavity 53a of the fixed die 53, so as to be able to guide the insert member 100A into the cavity 53a of the fixed die 53.

The moving unit 22c is provided on the convey rail 22b, and is formed to be movable along the convey rail 22b. The moving unit 22c fixes the support portion 31 of the chuck device 21A. The moving unit 22c moves along the convey rail 22b, and thereby the moving unit 22c moves the chuck device 21A in accordance with the movement of the moving unit 22c. The moving unit 22c is formed to be able to adjust the position in the gravitational direction of the support portion 31.

Since the first rail portion 22d is formed in parallel to the hold portions 11b, this convey mechanism 22A can take out one insert member 100A, which is fixed to the chuck 32A, from the hold portions 11b, by simply moving the moving unit 22c along the first rail portion 22d. In addition, by moving the moving unit 22c along the second rail portion 22e and third rail portion 22f, the convey mechanism 22A can dispose the insert member 100A, which is fixed to the chuck 32A, in the cavity 53a of the fixed die 53.

The control device 19 is formed to be able to detect the position of the insert member 100A that is located at an outermost position, among the insert members 100A stored in the storage section 11A. Incidentally, the insert member 100A that is located at an outermost position is the insert member 100A which is located at an outermost position in the direction in which the insert member 100A is taken out. In other words, the insert member 100A that is located at an outermost position is the insert member 100A which is located at a farthest position from the base portion 11a.

Next, referring to FIG. 7, the operation of the molded article manufacturing apparatus 1 is described. Incidentally, FIG. 7 illustrates that part of the convey device 12A, which is lower than the convey rail 22b, as viewed in the downward direction from above.

To begin with, the control device 19 moves the moving unit 22c to the storage section 11A along the first rail portion 22d. In accordance with the movement of the moving unit 22c, the chuck device 21A also moves. If the control device 19 moves the moving unit 22c to a position where the chuck 32A comes in contact with an upper end portion of the insert member 100A, the control device 19 stops the movement of the moving unit 22c.

Next, the control device 19 operates the vacuum generation pump 35. By operating the vacuum generation pump 35, a negative pressure occurs at the suction holes 32c. By this negative pressure that has occurred, the insert member 100A is fixed to the chuck 32A.

Subsequently, the control device 19 moves the moving unit 22c along the first rail portion 22d. Since the first rail portion 22d extends in parallel to the hold portions 11b, the through-holes 101 of the insert member 100A are disengaged from the hold portions 11b and the insert member 100A is taken out of the storage section 11A, by moving the moving unit 22c along the first rail portion 22d.

Next, the control device 19 moves the moving unit 22c along the second rail portion 22e. With the moving unit 22c moving along the second rail portion 22e, as illustrated in FIG. 8, the insert member 100A passes between the heating units 41, or stops between the heating units 41, and the insert member 100A is heated up to a predetermined temperature.

After the insert member 100A is heated up to a desired temperature, the moving unit 22c is further moved along the second rail portion 22e. If the moving unit 22c reaches the third rail portion 22f, the control device 19 moves the moving unit 22c along the third rail portion 22f. Thereby, the insert member 100A is conveyed (disposed) in the cavity 53a of the fixed die 53. In the meantime, for example, when the insert member 100A is disposed in the cavity 53a of the fixed die 53, the insert member 100A is moved to a position above the fixed die 53, and then the height of the support portion 31 is adjusted so that the insert member 100A may be disposed in the cavity 53a, and the insert member 100A is moved to the cavity 53a.

After the insert member 100A is disposed in the cavity 53a, the control device 19 stops the movement of the moving unit 22c, and stops the operation of the vacuum generation pump 35. Thereby, the fixation of the insert member 100A to the chuck 32A is released, and the insert member 100A is disposed in the cavity 53a of the fixed die 53 (in the mold clamping device 52, in the die 51).

Next, the toggle mechanism 58 is driven, and the insert member 100A is pressed and shaped in accordance with the shapes of the cavities 53a and 54a. In conjunction with this, the housing 61 is moved, the injection nozzle 62a is connected to the gate that is formed in the fixed die 53, and the resin material, which is supplied in the cylinder 62 from the hopper 64 and is melted, is injected via the gate. Thereby, the resin material is injected in the cavity 53a, 54a, and the resin material is supplied in the shape of the cavity 53a, 54a.

Next, the shaped insert member 100A and the injected resin material are cooled in the die 51, and a molded article is formed. Then, the movable die 54 is moved, the die 51 is set in the open state, and the molded article is taken out of the die 51 by the extrusion pin that is provided on the fixed die 53 or movable die 54.

In addition, the chuck 32A is cooled by the cooling device 34 during a period from the mold-clamping to the take-out of the molded article, an insert member 100A is conveyed to the heating device 13 once again along the convey rule 22b, and the insert member 100A for use in the next molding is heated. Subsequently, the same fabrication steps are repeated. By the repetition of these fabrication steps, molded articles are successively manufactured.

According to the molded article manufacturing device 1A with the above-described structure, like the above-described molded article manufacturing device 1, the area of installation of the molded article manufacturing apparatus 1A can be reduced and the productivity can be enhanced by the convey device 12A and heating device 13, which can convey the insert member 100A, which is stored in the storage section 11A in the vertical attitude, from the storage section 11A in the vertical attitude, and can heat the insert member 100A in the vertical attitude. Moreover, also in the molded article manufacturing apparatus 1A according to the second embodiment, the same advantageous effects as in the first embodiment can be obtained.

(Third Embodiment)

Next, a molded article manufacturing apparatus 1B according to a third embodiment of the present invention will be described with reference to FIG. 9.

Figure 9:
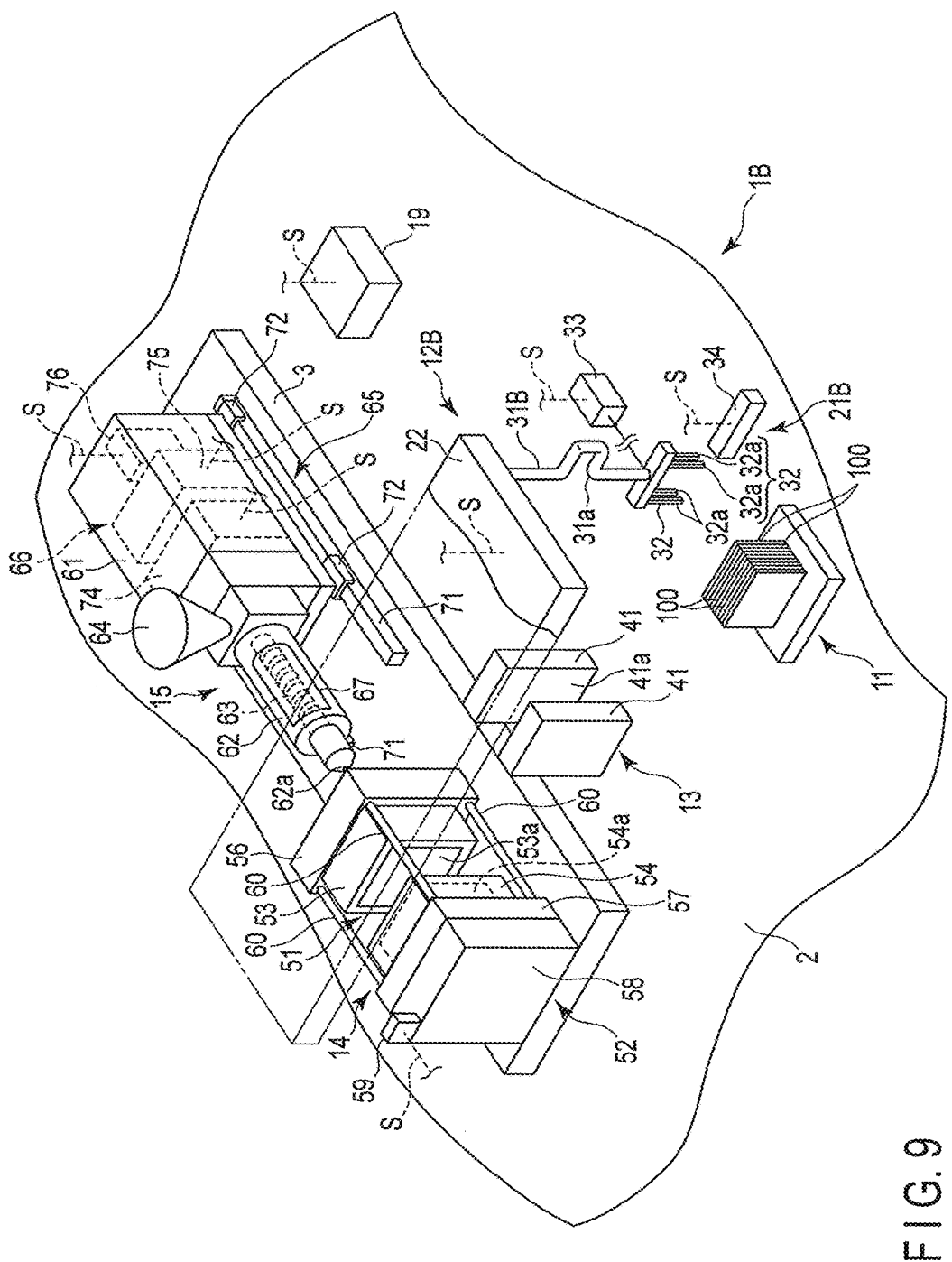
FIG. 9 is a perspective view which schematically illustrates a molded article manufacturing apparatus according to a third embodiment of the invention.

FIG. 9 is a perspective view which schematically illustrates the structure of the molded article manufacturing apparatus 1B according to the third embodiment of the present invention. Incidentally, in the molded article manufacturing apparatus 1B according to the third embodiment, the same structure as in the molded article manufacturing apparatus 1 according to the above-described first embodiment is denoted by like reference numerals, and a detailed description thereof is omitted.

As illustrated in FIG. 9, the molded article manufacturing apparatus 1B includes, for example, a storage section 11, a convey device 12B, a heating device 13, a mold device 14, an injection device 15, and a control device 19. The molded article manufacturing apparatus 1B is disposed in an installation range 2 in a factory, etc.

The convey device 12B is formed such that the thermoplastic prepregs 100, which are an example of insert members, can be successively conveyed in their vertical attitude from the storage section 11 of thermoplastic prepregs 100 to the heating device 13 and mold device 14. Specifically, the convey device 12B includes a chuck device 21B and a convey mechanism 22.

The chuck device 21B includes, for example, a support portion 31B which is provided on the convey mechanism 22, a plurality of chucks 32, opening/closing means 33, and a cooling device 34.

As illustrated in FIG. 9, the support portion 31B is formed to be able to support the plural chucks 32. The support portion 31B is formed to be movable by the convey mechanism 22. As illustrated in FIG. 9, the support portion 31B is formed of, for example, a cylindrical rod member, and includes a clearance portion 31a at an intermediate part thereof.

The clearance portion 31a is formed by bending a part of the support portion 31B in a U shape. Specifically, the clearance portion 31a is formed by recessing a part of the support portion 31B, so that when the thermoplastic prepreg 100 has been moved to a position (a position corresponding to the cavity 53a of the fixed die 53) where the thermoplastic prepreg 100 is disposed in the cavity 53a of the fixed die 53 by the convey device 12B, one or plural tie-bars 60 of the mold device 14 (mold clamping device 52) can be positioned in the inside of the clearance portion 31a. The clearance portion 31a is provided at the same position as the position in the height direction of the tie-bar 60 that is located between the convey mechanism 22 and the cavity 53a in which the thermoplastic prepreg 100 is disposed.

According to the molded article manufacturing device 1B with the above-described structure, like the above-described molded article manufacturing device 1, the area of installation of the molded article manufacturing apparatus 1B can be reduced and the productivity can be enhanced by the convey device 12B and heating device 13, which can convey and heat the thermoplastic prepreg 100 in the vertical attitude. Moreover, also in the molded article manufacturing apparatus 1B according to the third embodiment, the same advantageous effects as in the first embodiment can be obtained.

In addition, since the support portion 31B is provided with the clearance portion 31a, the molded article manufacturing apparatus 1B can move the thermoplastic prepreg 100 to the cavity 53a, in the state in which the thermoplastic prepreg 100 is positioned at the height of the fixed die 53.

Specifically, even if the mold clamping device 52 is provided with one or plural tie-bars 60, the one or plural tie-bars 60 can be disposed in the clearance portion 31a of the support portion 31B, and the thermoplastic prepreg 100 can be inserted in the die 51 (mold clamping device 52) without varying the height of the thermoplastic prepreg 100. Thus, there is no need to move the thermoplastic prepreg 100 in the upward direction of the fixed die 53 and then to lower the thermoplastic prepreg 100 toward the cavity 53a of the fixed die 53, and the movement distance and time of the thermoplastic prepreg 100 can be reduced. As a result, the molded article manufacturing apparatus 1B can shorten the molding cycle of molded articles and can enhance the productivity of molded articles.

In the meantime, the present invention is not limited to the above-described embodiments. For example, in the above-described examples, the molded article manufacturing apparatus 1 includes, as the molding device, the mold clamping device 52, die 51 and injection device 15, and is configured to form a molded article by shaping and injection-molding the thermoplastic prepreg 100 by the mold clamping device 52, die 51 and injection device 15. However, the invention is not limited to this configuration. For example, the molded article manufacturing apparatus 1 may be configured to not include the injection device 15 but to include only the mold clamping device 52 as the molding device (for example, a pressing machine (press molding machine)), and may be configured to form a molded article only by shaping the thermoplastic prepreg 100 by using the die 51.

Additionally, in the above-described examples, the description has been given of only the configuration of the convey device 12, in which the convey device 12 holds a peripheral edge of the thermoplastic prepreg 100 by two chucks 32. However, the invention is not limited to this configuration. For example, such a configuration may be adopted that chucks 32 are provided at two locations on each of upper and lower sides, or chucks 32 may be provided at three or more locations at the upper edge of the thermoplastic prepreg 100. Besides, the position where the chuck 32 holds the peripheral edge can properly be set in accordance with the shape of the thermoplastic prepreg 100, and also the shapes of the distal ends of the fixed claw portion 32a and movable claw portion 32b can properly be set. However, if the chuck 32 can hold the thermoplastic prepreg 100, it is preferable that the area of contact with the thermoplastic prepreg 100 is as small as possible.

In the above-described embodiments, the cooling device 34 is configured to be able to cool those parts of the claw portions 32a, 32b of the chucks 32, which come in contact with the thermoplastic prepreg 100. However, the invention is not limited to this configuration. For example, the cooling device 34 may be configured to be able to cool the opening/closing means 33 too. By this configuration, it becomes possible to further prevent the heat, which is produced by the heating units 41 of the heating device 13, from being conveyed to the opening/closing means 33, and to prevent the chuck device 21, in particular, the opening/closing means 33 of the chuck device 21, from failing due to heat. As a result, not only an increase in maintenance cost can be suppressed, but also degradation in productivity of molded articles can be prevented.

Figure 10:
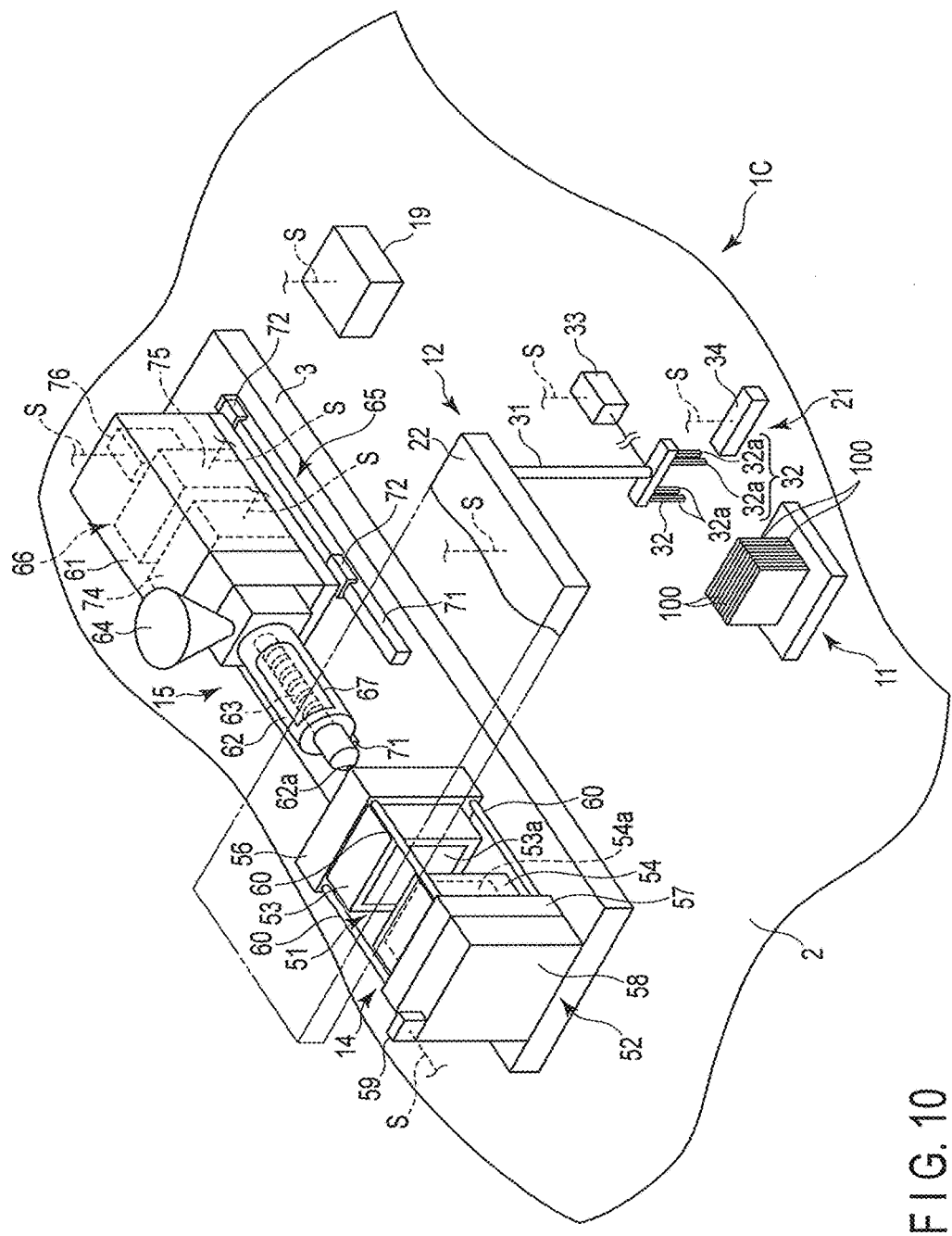
FIG. 10 is a perspective view which schematically illustrates a molded article manufacturing apparatus according to a fourth embodiment of the invention.

Additionally, in the above-described examples, the molded article manufacturing apparatus 1, 1A, 1B is configured to include the heating device 13, but the invention is not limited to this configuration. As in a molded article manufacturing apparatus 1C according to a fourth embodiment illustrated in FIG. 10, the molded article manufacturing apparatus may not include the heating device 13. Incidentally, the molded article manufacturing apparatus 1C illustrated in FIG. 10 has the same structure as the molded article manufacturing apparatus 1, except that the molded article manufacturing apparatus 1C is configured to not include the heating device 13. In this case, although the molded article manufacturing apparatus 1C does not have the advantageous effect obtained by the heating device 13, the insert member 100 can be stored in the storage section 11 in the vertical attitude, and the insert member 100 can be conveyed by the convey device 12 to the fixed die 53 while the vertical attitude is being maintained.

Additionally, in the above-described examples, the insert member (thermoplastic prepreg) 100, 100A has been described as having the structure in which the insert member 100, 100A is formed in the sheet shape, but the invention is not limited to this structure. The insert member 100, 100A may have the sheet shape or may not have the sheet shape, but it is preferable that the insert member 100, 100A has the sheet shape.

The chuck 32 may be fixed to the thermoplastic prepreg 100 by means other than the means described in the first to fourth embodiments. As other means, for example, a magnet may be used if the thermoplastic prepreg 100 is a metal which is detachably fixed to the magnet.

Additionally, in the first embodiment to third embodiment, such a configuration may be adopted that when continuous molding (continuous molding cycle) is performed, in order to make ready an operation of insertion in the die 51 (mold clamping device 52) in the next molding cycle, the chuck 32, which holds the thermoplastic prepreg 100 for use in the next molding cycle, is stopped between the heating units 41 of the heating device 13, and the thermoplastic prepreg 100 for use in the next molding cycle is heated, and is made to stand by between the heating units 41 of the heating device 13 or near the heating device 13. By this configuration, the molding cycle can be made shorter.

Additionally, in the first embodiment to third embodiment, such a configuration may be adopted that the heating device 13 is not provided as a separate body (separately), but the heating device is provided within the chuck device 21 or within the convey device 12. When this configuration is adopted, the thermoplastic prepreg 100 can be conveyed by the convey device 12 while the thermoplastic prepreg 100 is being heated by the heating device 13. Besides, when continuous molding (continuous molding cycle) is performed, such a configuration may be adopted that the thermoplastic prepreg 100, while being heated by the heating device 13, is conveyed by the convey device 12 to the vicinity of the die 51 (mold clamping device 52), and the thermoplastic prepreg 100 is made to stand by, while being heated by the heating device 13, near the die 51 (mold clamping device 52) until the thermoplastic prepreg 100 becomes insertable in the die 51 (mold clamping device 52). By this configuration, the molding cycle can be shortened.

Additionally, such a configuration may be adopted that the thermoplastic prepreg 100 is conveyed by the convey device 12 to the vicinity of the die 51 (mold clamping device 52), and the thermoplastic prepreg 100 can be heated by the heating device 13 immediately before the thermoplastic prepreg 100 is inserted in the die 51 (mold clamping device 52). Thereby, the molding cycle can be shortened, and deformation of the sheet-shaped thermoplastic prepreg 100 can be further suppressed.

Additionally, although the convey device 12, 12A in the first embodiment to fourth embodiment is configured to make use of the ceiling, the invention is not limited to this configuration. The convey device 12, 12A may be, for example, a convey device attached to an upper part of the molding device, which is equipped with a convey rail or the like. Additionally, in the first to fourth embodiments, although the resin material is used as a material which is injected, the invention is not limited to this, and the material that is injected may be, for instance, glass, a metal, carbon fibers, aramid fibers, a compound thereof, or a mixture thereof. Additionally, although the present invention is applied to the injection molding device, the invention is not limited to this. The present invention may be applied to a transfer molding device. Besides, various modifications can be implemented without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a molded article, comprising:
- conveying, by a convey device, a thermoplastic prepreg to a heating device in an attitude in which a major surface of the thermoplastic prepreg is in a substantially gravitational direction, the convey device comprising:
  - a holding device configured to hold the thermoplastic prepreg in the attitude, the holding device comprising a chuck and a cooling device configured to cool the chuck, and
  - a convey mechanism configured to convey the thermoplastic prepreg while the thermoplastic prepreg is being held in the attitude by the holding device;
- heating, by the heating device, the thermoplastic prepreg which has been conveyed in the attitude;
- conveying, after the heating, the thermoplastic prepreg to a molding device to which a die is attached;
- molding the thermoplastic prepreg by the molding device; and
- controlling, by a controller, the cooling device to cool the chuck after the thermoplastic prepreg is conveyed to the molding device and before a second thermoplastic prepreg is conveyed to the heating device.

2. The method of manufacturing a molded article of claim 1, wherein the thermoplastic prepreg is heated and made to stand by, before the thermoplastic prepreg is conveyed into the molding device.

3. The method of manufacturing a molded article of claim 1, wherein the thermoplastic prepreg is heated immediately before the thermoplastic prepreg is conveyed into the molding device.

* * * * *